United States Patent [19]
Kamogawa

[11] 3,716,467
[45] Feb. 13, 1973

[54] PROCESS FOR THE RADIATION INSOLUBILIZATION OF N-(VINYL) PHENYLACRYLAMIDE

[75] Inventor: Hiroyoshi Kamogawa, Kawasaki, Japan

[73] Assignee: Agency of Industrial Science and Technology, Tokyo, Japan

[22] Filed: March 15, 1972

[21] Appl. No.: 234,985

Related U.S. Application Data

[62] Division of Ser. No. 838,662, July 2, 1969, abandoned.

[30] Foreign Application Priority Data

July 5, 1968 Japan .................................. 43/46865
July 5, 1968 Japan .................................. 43/46866

[52] U.S. Cl. ..... 204/159.18, 204/159.14, 260/80.3 E, 260/80.3 N, 260/86.1 N, 260/88.1 P, 260/88.1 PN, 260/89.7 R

[51] Int. Cl. ............................. C08d 1/10, C08f 1/16

[58] Field of Search .260/562 R, 89.7 R; 204/159.14, 204/159.18

[56] References Cited

UNITED STATES PATENTS 3,458,487   7/1969   Mortimer .......................... 260/80.73
2,880,153   3/1959   Hirtz et al ........................ 204/159.24

*Primary Examiner*—Murray Tillman
*Assistant Examiner*—Richard B. Turer
*Attorney*—Ernest G. Montague

[57] ABSTRACT

A process for the insolubilization of N-(vinyl)phenylacrylamide polymers which comprises polymerizing or copolymerizing by cationic catalysts thereby producing soluble polymers, and irradiating the resulting soluble polymers with light in the presence of a light polymerization initiator thereby polymerizing the vinyl groups remaining in said soluble polymers and three-dimentional network structure polymers produced by the above mentioned process.

7 Claims, No Drawings

PROCESS FOR THE RADIATION INSOLUBILIZATION OF N-(VINYL) PHENYLACRYLAMIDE

REFERENCE TO CO-PENDING APPLICATION

This is a divisional application of my co-pending application Ser. No. 838,662, filed July 2, 1969, now abandoned.

This invention relates to a process for the insolubilization of an N-(vinyl)phenylacrylamide polymer by irradiation with light and to insoluble three-dimensional network structure polymers which are produced by the said process. More particularly, this invention relates to a process for insolubilizing an N-(vinyl)phenylacrylamide polymer which comprises polymerizing the synthesized N-(vinyl)phenylacrylamide by a cationic catalyst, and irradiating the resulting polymer with light with stannous chloride as catalyst thereby polymerizing and cross-linking the vinyl group of the acryl portion remaining in said polymer and to insoluble three-dimensional network structure polymers which are produced by the said process.

As a known literature on the process for insolubilization by irradiation with light, mention may be made of the specification of U.S. Patent 2,880,152 in which a process for the photo-polymerization of acrylamides with stannous chloride as catalyst is described, but there is no precedent showing that, as in this invention, stannous chloride is used as catalyst in the photo-polymerization of divinyl compounds each having vinyl groups of different electron densities at both ends.

The object of this invention is to provide a process for easily insolubilizing an N-(vinyl)phenylacrylamide polymer having vinyl groups of different electron densities by irradiation with light.

Another object of this invention is to provide insoluble three-dimensional network structure polymers which are produced by the said process.

The N-(p-vinyl)phenylacrylamide is a divinyl compound in which, as shown in the following formula, a styrene portion and an acrylamide portion are present together in the molecule, and has a structure in which the vinyl groups at both ends of the molecule differ much in electron density.

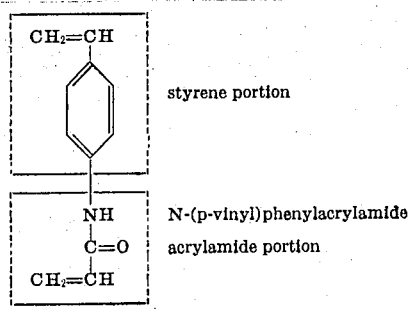

Therefore, when the N-(p-vinyl)phenylacrylamide is polymerized with a cationic polymerization catalyst such as boron trifluoride ($BF_3$) or the like, the vinyl group alone of the styrene portion which is high in electron density polymerizes to give a soluble polymer having an acryl group in the side chain, while, to the contrary, with an anionic polymerization catalyst such as butyl lithium, lithium in tetrahydrofuran or the like, the vinyl group alone of the acryl portion which is low in electron density polymerizes to give a soluble polymer having a styrene portion in the side chain. That is to say, by the cationic or anionic polymerization of the N-(p-vinyl)-phenylacrylamide as a monomer, it is possible to polymerize one vinyl group alone, allowing the other vinyl group to remain almost unreacted in the resulting polymer, and, moreover, the vinyl group remaining in the polymer thus formed exhibits the same reactivity as in the case of a low molecular compound, and, therefore, is capable of participating in various secondary reactions. For example, the vinyl groups of the polymer formed by cationic polymerization are low in electron density and, therefore, prone to cause a nucleophilic reaction such as Michael reaction or the like, while, to the contrary, the vinyl groups of the polymer formed by anionic polymerization are high in electron density and, therefore, prone to cause an electrophilic reaction such as oxidation, epoxidation, sulfurization or the like. Further, this type of polymer is cross-linked by the polymerization reaction between the remaining vinyl groups and thereby turns into an insoluble polymer having a three-dimensional network structure. Accordingly, if it is possible, by polymerizing one vinyl group alone of the N-(p-vinyl)phenylacrylamide, to synthesize a polymer and, thereafter, by photo-polymerization, to crosslink said polymer thereby insolubilizing it, then it is possible to utilize the N-(p-vinyl)phenylacrylamide as a monomer of light-sensitive synthetic resin.

As a result of research in a process the present inventor discovered a process for synthesizing a soluble polymer by the cationic polymerization of said N-(p-vinyl)phenylacrylamide and thereafter cross-linking said polymer by photo-polymerization with stannous chloride ($SnCl_2$) as catalyst and to insoluble three-dimensional network structure polymers which are produced by the said method.

We show one of representative processes for synthesizing a N-(vinyl)phenylacrylamide which is used for this invention. The N-(p-vinyl)phenylacrylamide is synthesized by the reaction of P-aminostyrene with acrylic chloride as shown in the following formula.

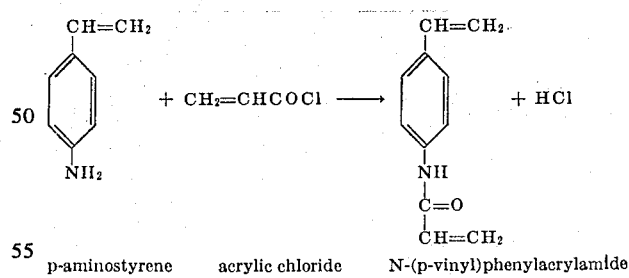

This reaction, being a vigorous exothermic reaction, is completed in a very short time at normal temperature. Accordingly, for improving the yield and preventing the polymerization of the resulting monomer, it is desirable to carry out this reaction in the presence of a solvent at a relatively low temperature.

The solvent to be used in this invention must, of course, be free from reactivity with the raw material acrylic chloride. Also, because, for improving the yield, it is desirable, after reaction, to dilute the reaction solution with water to precipitate the product, the solvent is preferably a solvent which has no active hydrogen and which is soluble in water. Further, because hydrogen chloride is formed as a reaction byproduct, as shown in the formula above mentioned, the solvent is preferably a basic organic solvent which has no active hydrogen and which acts only as a hydrogen chloride acceptor. From these points of view, the solvents usable in this invention are acetonitrile, dioxane, tetrahydrofuran, dimethyl sulfoxide, pyridine, quinoline, and triethylamine. Also, the p-aminostyrene and acrylic chloride to be used in this invention need not always be pure articles, it being allowable even if some impurities are mixed in since they are removed later in the recrystallization operation.

In the above-mentioned reaction, one equivalent of p-aminostyrene is dissolved in a solvent selected from among those mentioned above and, while the resulting solution is being maintained at room or lower temperature under stirring and cooling, 1 – 1.5 equivalents of acrylic chloride is added dropwise to produce an N-(p-vinyl)phenylacrylamide. According to this process, the reaction need not be carried out under heating for many hours, so there occurs no polymerization of the reactants and the product, with the result that the object monomer can be obtained in high yields.

In the reaction mentioned, the monomer formed and unreacted aminostyrene alone can be precipitated by diluting the reaction product with a dilute alkali in the case of a neutral solvent such as acetonitrile or the like, or with a dilute acid in the case of a basic solvent such as pyridine or the like, and, further, the unreacted aminostyrene can be removed easily by recrystallization from an alcohol-water system, giving the object monomer in the form of white crystals.

Also, the amount of acrylic chloride sufficient to be added dropwise to one equivalent of aminostyrene is theoretically one equivalent, but, considering the water content in the monomer solvent and other factors such as the loss of acrylic chloride, it is preferable, for raising the yield of the monomer to the aminostyrene and improving the purity of the crude product, to increase the amount of acrylic chloride up to about 1.5 equivalents.

Also, in the above said reaction, the aminostyrene used as raw material is not limited only to p-aminostyrene; both m- and o-isomers may likewise be used. Further, the oxidized chloride used as raw material is not limited only to acrylic chloride; methacrylic chloride may likewise be used.

Next, a typical example of the reaction in which the thus-obtained N-(p-vinyl)phenylacrylamide as a monomer is cation-polymerized and the resulting polymer is insolubilized by photo-polymerization is shown in the following formula:

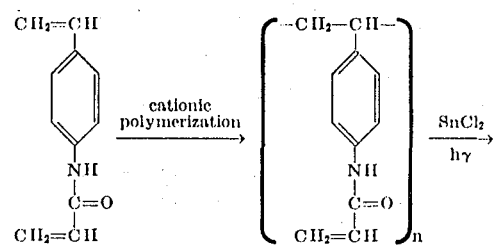

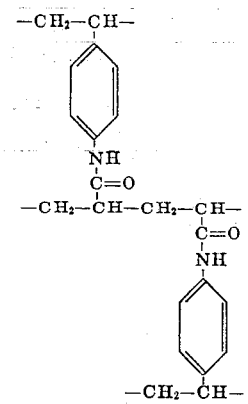

Here, as the catalyst for cationic polymerization, use may be made of conventional boron trifluoride or the like to give a soluble polymer.

This type of polymer, when photo-polymerized with stannous chloride as catalyst, easily become cross-linked and thereby insolubilized. Even if this photo-polymerization is carried out in the presence of styrene, acrylic ester or any other monomer which is copolymerizable with the acryl group in the polymer, or in a mold, the resulting polymer is insolubilized and becomes good in film form. Also, the polymer may be masked appropriately to obtain an image.

Further, as the polymer, use may be made not only of a cationic polymer of N-(p-vinyl)phenylacrylamide alone, but of a copolymer of said amide with one or more chain polymeric monomers, for example, styrene, α-methylstyrene, (metha)-acrylic ester, vinyl ether, and the like, which improve the mechanical properties, such as solubility, film-forming ability, strength, and the like, of the resulting polymer, or a cationic polymer of both o- and m-isomers of N-(vinyl)-phenylacrylamide.

Also, as the catalyst, a photo-polymerization initiator hitherto known with respect to acrylamide monomers, for example, the combination of an oxidizing color and a reducing agent (rose bengal-phenylhydrazine, methylene blue-phenylhydrazine, fluorescein-ascorbic acid, or the like), is also effective to some extent, but, in particular, stannous chloride ($SnCl_2$) exhibits an excellent effect. This stannous chloride is a catalyst which is very advantageous in that it is moderate in price, does not color the product, and, moreover, does not require any other initiator.

The polymerization initiation mechanism with stannous chloride as catalyst is not considered to be a pure radical mechanism alone, but is presumed to include an ion mechanism, too, which proceeds by virtue of an ion radical complex to be formed by the vinyl group and the catalyst; however, the reaction is carried out very quickly by electric lamplight.

As the light source, tungsten lamplight, direct sunlight and mercury lamplight are effective, but, in particular, visible rays are most effective.

Accordingly, in this invention, photo-polymerization is carried out very simply and at low cost, and, even in the open air, insolubilization is carried out fully effectively in a short time. Because of this, the N-(vinyl)phenylacrylamide polymer can be made into a light-sensitive synthetic resin which is effective in a wide range.

Preferred working examples of this invention are given hereunder, but these examples are not to be construed to limit the scope of this invention.

EXAMPLE 1

11.9g(0.10 mol) of p-aminostyrene synthesized by the caustic potash dehydration of β-(4-amino)phenethyl alcohol was dissolved in 100 ml of acetonitrile and, under stirring and cooling (0° –5°C), 18g (0.15 mol) of acrylic chloride dissolved in 50 ml of acetonitrile was added dropwise. The resulting white reaction solution was stirred for 30 minutes at room temperature and thereafter charged into a large amount of dilute ammonia water under stirring to form a white precipitate, which was collected by filtration, washed fully with water, and recrystallized from an ethanol-water system to obtain white crystals (melting point 128° – 130°C). The yield was 69 percent.

Analytical Value (Calculated as $C_{11}H_{11}No$): C, 76.30; H, 6.36; N, 8.09
Found Value: C, 76.18: H, 6.51: N, 8.07

An infrared spectrum showed a strong absorption of C = 0 at 1670 cm$^{-1}$ (acrylamide portion), and, at the same time, showed an absorption of light in ethanol was 295 m$\mu$. From this, the crystal obtained was confirmed to be an N-(p-vinyl)phenylacrylamide.

The N-(p-vinyl)phenylacrylamide thus purified by recrystallization. One part of this purified N-(p-vinyl)phenylacrylamide was dissolved in 10 parts of ethylene dichloride and maintained at −40°C. Then, under stirring, 0.1 part of boron trifluoride-etherate [$BF_3 \cdot 0 \ (C_2H_5)_2$] was added and the resulting solution was stirred for 5 hours. This solution was heated up to room temperature and then charged into a large amount of petroleum ether to form a polymer precipitate, which was filtrated and dried. The precipitate was dissolved in ethanol, reprecipitated in aqueous ammonia, thereby purified, filtrated and washed with water to obtain the desired cationic polymer. The intrinsic viscosity was $[\eta]^{20°}_{ethanol} = 0.11$.

One part of the cationic polymer thus produced was dissolved in one part of ethanol. Then, in this solution, 0.05 part of stannous chloride was dessolved under shielding of direct light, and the resulting solution was poured onto a glass plate and air-dried to form a transparent film. This film was then positioned 30 cm distant from a 500W tungsten lamp (80,000 lux) and irradiated with the light from said lamp for 2 minutes (green fluoresence). After irradiation, the film was dipped in ethanol and measured for the insoluble matter, which was found to be 81.2 percent (polymer alone, 0 percent).

The ethanol-insoluble matters of the films prepared, and treated, in the same manner by adding 0.5 percent rose bengal + 5 percent phenylhydrazine, 0.5 percent methylene blue + 5 percent phenylhydrazine, 0.5 percent fluorescein + 5 percent ascorbic acid, and 5 percent ammonium cerium nitrate (IV) separately to the polymer solution were 27.8, 25.0, 18.7 and 45.8 percent, respectively.

EXAMPLE 2

4.3 parts of N-(p-vinyl)phenylacrylamide and 2.6 parts of styrene were dissolved in 6.3 parts of ethylene dichloride and maintained at −40°C under stirring. 0.7 part of boron trifluoride-etherate was then added, and stirring was continued for 5 hours. The resulting solution was heated up to room temperature and then charged into a large amount of petroleum ether to form a precipitate, which was filtrated, dried, then dissolved in a small amount of tetrahydrofuran, reprecipitated in dilute ammonia water, thereby purified, filtrated and washed with water to obtain the desired cationic copolymer ($[\eta]^{20°}_{THF} = 0.17$).

One part of the thus-produced cationic copolymer with styrene was dissolved in one part of tetrahydrofuran, followed by the addition, under shielding of direct light, of 0.05 part of stannous chloride dissolved in 0.5 part of ethanol. The resulting solution was poured onto a glass plate and air-dried to form a transparent film. Upon irradiation of this film with the light from a 500W tungsten lamp, the following results were observed.

| Irradiation Time, min. | Insoluble Matter (Tetrahydrofuran), % |
|---|---|
| 0 | 0 |
| 2 | 39.2 |
| 5 | 97.3 |
| 10 | 100 |

In this case, with the polymer alone, the insoluble matter was 0 percent even after irradiation for 10 minutes.

I claim:

1. A process for the insolubilization of N-(vinyl)phenylacrylamide polymers which comprises polymerizing N-(vinyl)-phenylacrylamide by cationic catalysts thereby producing soluble polymers, and irradiating the resulting soluble polymers with light in the presence of a light polymerization initiator thereby polymerizing the vinyl groups remaining in said soluble polymers.

2. A process according to claim 1 in which the light polymerization initiator is stannous chloride.

3. A process according to claim 1 in which the irradiation with light is carried out by means of a light source selected from direct sunlight, mercury lamplight, and tungsten lamp-light.

4. A process for the insolubilization of N-(vinyl)phenylacrylamide polymers which comprises copolymerizing N-(vinyl)-phenylacrylamide with chain polymeric monomers by cationic catalyst thereby producing soluble copolymers, and irradiating the resulting soluble polymers with light in the presence of a light polymerization initiator thereby polymerizing the vinyl groups remaining in said soluble copolymers.

5. A process according to claim 4 in which the chain polymeric monomers are at least one selected from styrene, methylstyrene, α-methylstyrene, methacrylic ester, vinyl ether and acrylic ester.

6. A process according to claim 4 in which the light polymerization initiator is stannous chloride.

7. A process according to claim 4 in which the irradiation with light is carried out by means of a light source selected from direct sunlight, mercury lamplight, and tungsten lamp-light.

* * * * *